(12) United States Patent
Jafeld et al.

(10) Patent No.: US 8,641,997 B2
(45) Date of Patent: Feb. 4, 2014

(54) PROCESS FOR PRODUCING SHAPED ARTICLES OF INORGANIC CYANIDES AND PRODUCTS OBTAINABLE BY THE PROCESS

(75) Inventors: Markus Jafeld, Frechen (DE); Stephan Schäflein, Haltern (DE); Norbert Steier, Euskirchen (DE); Annette Dickmann, Rodenbach (DE); Stefan Franke, Bad Vilbel (DE); Andreas Rubo, Leihgestern (DE); Manfred Sauer, Rodenbach (DE); Ernst Gail, Egelsbach (DE)

(73) Assignee: CyPlus GmbH, Hanau-Wolfgang (DE)

( * ) Notice: Subject to any disclaimer, the term of this patent is extended or adjusted under 35 U.S.C. 154(b) by 725 days.

(21) Appl. No.: 12/198,216

(22) Filed: Aug. 26, 2008

(65) Prior Publication Data

US 2008/0317655 A1 Dec. 25, 2008

Related U.S. Application Data

(63) Continuation of application No. 10/203,750, filed as application No. PCT/EP01/00757 on Jan. 24, 2001, now abandoned.

(30) Foreign Application Priority Data

Feb. 16, 2000 (DE) .................. 100 06 862

(51) Int. Cl.
*C01C 3/08* (2006.01)
(52) U.S. Cl.
USPC .......................................... 423/371
(58) Field of Classification Search
USPC ................. 264/109, 299, 310, 210; 425/579
See application file for complete search history.

(56) References Cited

U.S. PATENT DOCUMENTS

| 1,923,570 A | * | 8/1933 | Gabel | ............................ 264/125 |
| 2,726,139 A | | 12/1955 | Oliver | ............................ 423/379 |
| 2,843,879 A | * | 7/1958 | Komarek et al. | ............. 425/237 |
| 2,944,344 A | * | 7/1960 | Green et al. | ..................... 34/424 |
| 3,197,883 A | * | 8/1965 | Hartert et al. | .................... 34/371 |
| 3,206,278 A | | 9/1965 | Green | ........................... 423/200 |
| 3,207,574 A | | 9/1965 | Popper | .......................... 423/379 |
| 3,760,048 A | * | 9/1973 | Sullivan et al. | ............... 501/129 |
| 5,674,617 A | * | 10/1997 | Riemenschneider et al. | 428/402 |
| 6,162,263 A | * | 12/2000 | Day et al. | ...................... 23/302 T |

FOREIGN PATENT DOCUMENTS

| DE | 11 50 367 B | 6/1963 |
| EP | 0 197 216 | 10/1986 |
| EP | 0 857 689 | 8/1998 |
| ES | 446 317 | 3/1976 |
| ES | 446317 | 6/1977 |
| ES | 538 296 | 8/1985 |

OTHER PUBLICATIONS

International Preliminary Examination Report (PCT/IPEA/409) (translated) issued for PCT/EP01/00757.

* cited by examiner

*Primary Examiner* — Larry Thrower
*Assistant Examiner* — Xue Liu
(74) *Attorney, Agent, or Firm* — Smith, Gambrell & Russell, LLP

(57) ABSTRACT

The invention relates to a method for producing shaped inorganic cyanide bodies, especially made of alkaline metal cyanides and alkaline earth metal cyanides, by pressing particulate inorganic cyanide obtained by means of a crystallization method. According to the invention, a cyanide crystallate separated from a mother liquor by means of a solid-liquid separation device and containing 2-15 wt. % water is fed to a forming device without the addition of an auxiliary forming agent and placed under pressure and compressed to form shaped bodies containing 0.1-12 wt. % water. The amount of water contained by the shaped bodies is always less than that contained in the crystallates used for the production thereof. Preferably, the crystallite is pressed out of a rotary filter or a centrifuge at a temperature of more than 40° C. to form shaped bodies containing 0.2-6 wt. % residual water. The inventive method can be carried out in a more economical manner than previously known methods using dried cyanide. The invention also relates to shaped inorganic cyanide bodies obtained according to said method.

3 Claims, No Drawings

PROCESS FOR PRODUCING SHAPED ARTICLES OF INORGANIC CYANIDES AND PRODUCTS OBTAINABLE BY THE PROCESS

CROSS REFERENCE TO RELATED APPLICATION DATA

This application is a continuation of U.S. patent application Ser. No. 10/203,750, filed 18 Nov. 2002 now abandoned, which is a 371 of PCT/EP01/00757, filed 24 Jan. 2001, and claims the benefit of DE 100 06 862.6, filed 16 Feb. 2000, which are herein incorporated by reference in their entirety.

DESCRIPTION

The invention relates to a process for producing shaped articles, such as in particular briquets, of inorganic cyanides, in particular shaped articles of alkali cyanides and alkaline earth cyanides, such as sodium, potassium and calcium cyanide. The process comprises the conversion of particle-form cyanide obtained by a crystallisation process into substantially dust-free shaped articles by press moulding. The invention further relates to products obtainable using the process according to the invention.

Conventional commercial forms of inorganic cyanides used in the mining industry, chemical industry, electroplating companies and hardening shops comprise virtually dust-free pellets with a grain size in the range of from 0.1 to 5 mm, pulvinate briquets of approx. 15-40 g and cylindrical tablets of approx. 20-40 g and 20-40 mm diameter.

Inorganic cyanides, such as alkali and alkaline earth cyanides, are currently produced by a neutralisation process entailing reacting a solution of metal hydroxide with liquid or gaseous hydrogen cyanide. The reaction is generally performed at an elevated temperature; the neutralisation temperature is used for subsequent evaporation of water. Despite the simplicity of the reaction, careful process control is necessary, to prevent polymerisation of HCN, cyanide hydrolysis, formate formation and carbonate formation. Concentration and precipitation of the cyanide are appropriately performed in the presence of a small alkali hydroxide content under reduced pressure at below 100° C., preferably in a vacuum crystalliser. The crystals are separated off in a solid/liquid separating device, generally a filter or a centrifuge, from the mother liquor, which is recycled. The moist cyanide (=filter cake), the total water content of which (adherent moisture and water of hydration) is in the range of from 2 to 15 wt. %, but usually in the range of from 4 to 13 wt. %, depending on the solid/liquid separation conditions, is then dried by means of various processes to residual moisture contents of below 1 wt. %, generally below 0.1 wt. %, and converted into conventional commercial forms.

In the process according to U.S. Pat. No. 3,615,176, the cyanide is separated off from the mother liquor in a rotary filter, wherein air heated to 250 to 450° C. is fed to the filter hood, whereby predrying is performed and the moisture content is reduced to below 5 wt. %. The predried product is then dried adiabatically with hot air in a downstream drier to a residual moisture content of less than 0.05 wt. %. The dry powder is then compacted between compacting rolls under high pressure and the semi-plastic strip obtained is broken up and the pellets screen-fractionated. This multi-stage drying and shaping process is very energy-intensive and requires corresponding investment and maintenance-intensive plant. In addition, a considerable amount of dust arises, which has to be reliably separated off and recycled.

In the process according to EP-A 0 197 216, the two-stage drying of the previously described process is followed by briquetting of the dry cyanide, any dust fractions adhering to the surface being removed by means of a device for post-treating the briquet. This process is also technically very complex and has similar energy requirements to the process in U.S. Pat. No. 3,615,176.

Another, again very complex process for producing sodium cyanide pellets is disclosed in CN 1172071 A: after the neutralisation reaction, sodium cyanide dihydrate is crystallised out at low temperature (−6 to −12° C.); the crystals are melted, mixed with previously dried pellets and then pelletised; the pellets are dried by means of microwave drying to a residual moisture level of less than 0.5 wt. %. The process requires a large amount of energy, because approx. 0.7 t of water have to be evaporated per t of dried NaCN pellets and refrigerating brine is additionally required.

Finally, according to ES-Patent 538,296, shaped articles of inorganic cyanides may be produced by mixing crystallisate with a water content of from 2 to 8 wt. % with a cross-linking or swelling binder and a stabiliser and the mixture is pelletised at approximately 35° C. and then press moulded into cylindrical tablets. Instead of the combination of pelletisation and press moulding, it is also possible, according to ES-Patent 446,317, to convert an NaCN crystallisate containing binder into strands by means of an extruder; the strands are dried to a residual water content of approximately 0.2 wt. %. The advantages of these processes are lower investment costs and a lower energy requirement. A disadvantage, however, is the use of 0.1 to 10 wt. % of a foreign binder, such as mono-, di- or polysaccharide, agar-agar or gelatine, whereby product purity is reduced.

The object of the invention is consequently to provide a further, economically improved process for converting particle-form inorganic cyanide with a residual water content (sum of water of hydration and adherent water) in the range of from 2 to 15 wt. %, obtained using a crystallisation process, into stable, substantially dust-free shaped articles. The process should be performable without using shaping auxiliaries, product quality thus not being reduced by the presence of auxiliaries. According to a further object, the process should preferably not require a separate drying stage and should thus have only a small energy requirement. According to a further object, the shaped articles obtainable by the process according to the invention should be distinguished by a hardness level sufficient for practical purposes and quick solubility in water together with good storage stability.

These objects are achieved by a process for producing shaped articles of inorganic cyanides, in particular alkali metal cyanides and alkaline earth metal cyanides, comprising shaping of particle-form inorganic cyanide, obtained by a crystallisation process, by means of a device for shaping the particle-form cyanide by press moulding, which process is characterised in that a cyanide crystallisate with a total water content of from 2 to 15 wt. %, separated off from a mother liquor during the crystallisation process by means of a solid/liquid separating device, is fed to a shaping device without the addition of a shaping auxiliary and press moulded under pressure into shaped articles with a water content in the range of from 0.1 to 12 wt. %, wherein the water content of the shaped articles is always lower than that of the crystallisate used in the production thereof. The subclaims relate to preferred embodiments.

The process relates to the production of shaped articles of inorganic metal cyanides, but not cyano complexes. It relates especially to alkali metal and alkaline earth metal cyanides (hereinafter alkali and alkaline earth cyanides), such as in particular sodium, potassium and calcium cyanide, wherein sodium cyanide is particularly preferred as the industrially most important product from this series.

The process proper according to the invention is preceded by conventional cyanide production involving neutralisation of the metal hydroxide with hydrogen cyanide and crystallisation of the cyanide. The crystallised cyanide is separated off from the mother liquor by means of a conventional solid/liquid separating device, in particular a filter apparatus, such as a rotary filter, or a centrifuge. Separation of the crystallisate and partial dewatering preferably proceed continuously. In general, phase separation proceeds at a temperature in the range of from 20 to 80° C., but in particular from 40 to 70° C. Too high a total water content in the separated-off NaCN crystallisate is prevented by using a temperature above the transition temperature of sodium cyanide dihydrate (34.7° C.). Depending on the crystallisation conditions, the separating device used and the operating conditions therefor, the water content of the crystallisate is in the range of from 2 to 15 wt. %. Using a conventional rotary filter, a crystallisate may generally be obtained which has a water content in the range of from 4 to 15 wt. %, in particular 8 to 13 wt. %, while a centrifuge produces a crystallisate with a water content of from 2 to 10 wt. %.

The crystallisate thus obtained, which, as a result of the production process and for stabilisation purposes, preferably contains a small amount (0.1 to 1 wt. %, in particular 0.2 to 0.74 wt. %) of the metal hydroxide on which the cyanide is based, is fed to the shaping device without further drying and without the addition of a binder and press moulded therein. If desired, an additional stabiliser may also be added to the crystallisate. However, as a rule no stabiliser or other auxiliary is added, in order to achieve as pure as possible a product.

The shaping device may be of various designs, but in all cases the material introduced is compacted under pressure. Suitable devices are known to the person skilled in the art—by way of example, reference is made to the following documents: Ullmann's encyclopedia of industrial chemistry, $5^{th}$ ed. (1988), Vol. B2, 7-28 to 7-32; Lehrbuch für Mechanische Verfahrenstechnik, Springer (1994), Press Agglomeration chapter, pages 210-224. Suitable devices are screw and roll compressors, extruders, briquetting machines, stamping presses and tabletting machines. Continuously operating briquetting machines are particularly preferred, wherein the compacting rolls have a structure corresponding to the shape of the shaped articles to be produced. The compacting pressure to be applied depends on the desired degree of compaction and hardness of the shaped articles. The force applied in a conventional briquetting machine is generally in the range of from 10 to 140 N/cm with a roll diameter of 1000 mm.

In the case of compaction and in particular briquetting, where a crystallisate is used with the claimed water content a sludge-type liquid (=suspension of metal cyanide in water) is discharged at the nip, which is drained away and recycled in the crystalliser. Thus, compacting results in dewatering of the shaped article to be formed, such that hot gas or microwave drying is not necessary. As is clear from the Examples, a crystallisate with a water content of from 8 to 13 wt. % may be dewatered in a briquetting machines to yield briquets with a water content of from 0.5 to 6 wt. %. In the case of a lower feedstock water content, i.e. approximately 2 to 10%, in particularly 3 to 8%, as may be obtained by centrifuging the crystallisate, briquets may be obtained with a water content in the range of from 0.1 to 5 wt. %.

In the process according to the invention, in particular in the production of shaped articles of uniform size, such as briquets and tablets or extrudates, dust contamination is prevented. No drying stage is necessary either before or after shaping. The temperature of the material to be compacted, the water content thereof and the compaction pressure are parameters which affect the properties of the shaped articles.

The invention also provides the shaped articles of inorganic cyanides, especially sodium cyanide shaped articles, exhibiting an exceptional combination of properties which may be obtained by the process according to the invention.

Surprisingly, compaction of the crystallisate containing from 2 to 15 wt. % water results in shaped articles whose water content is usually reduced by compaction, in general to values equal to or less than 6 wt. %, preferably equal to/less than 5 wt. %, and which post-harden within a few minutes of compaction. This post-hardening effect is particularly pronounced with sodium cyanide; this may be a consequence of dihydrate formation with the residual water.

The shaped articles produced according to the invention surprisingly exhibit hardness sufficient for a saleable and thus dust-free product despite the considerably lower pressure used during press moulding in comparison with press moulding of a conventionally dried product. Moreover, it has been noted that the shaped articles according to the invention dissolve at least as quickly and sometimes more quickly in water than shaped articles made from dried cyanide.

The shaped articles according to the invention are distinguished by high product purity, because no auxiliaries are added as binders for shaping. The sole binder appears to be the residual water remaining in the shaped articles. Despite a certain residual water content of equal to/less than 6 wt. % to approximately 0.2 wt. % in the shaped articles according to the invention, the latter surprisingly do not exhibit formate and carbonate contents any greater than those of shaped articles produced by previously known processes, whose water content was reduced to values of below 0.1 wt. % by drying before, during or after shaping. Despite said certain residual water content and a low metal hydroxide content of from 0.1 to 1 wt. %, especially of around/below 0.5 wt. %, substantially no formate or ammonia formation and no undesired HCN polymerisation and thus no discoloration occur under conventional storage conditions over three months of storage. Another non-foreseeable property was the reduced lump forming tendency of metal cyanide shaped articles, in particular sodium cyanide shaped articles, according to the invention as compared with shaped articles made of particle-form cyanide previously subjected to intensive drying. The following Examples illustrate the process according to the invention together with the products obtainable thereby.

EXAMPLE 1

Compaction of Sodium Cyanide Crystallisate Isolated by Means of a Rotary Filter

The sodium cyanide crystallisate with a residual moisture content of from 8 to 13 wt. % obtainable using a conventional rotary filter was used. The NaCN content was between 86 and 91%. The minor constituents still present in the NaCN crystallisate were: NaOH=0.2-0.7%, $Na_2CO_3$=0.1-0.4% and formate=0-0.2%. The temperature of the crystallisate used for compaction was in the range from 20 to 70° C.

A briquetting machine of conventional construction for producing pulvinate shaped articles with a weight of 15 g (or 7 g in the case of an experimental briquetting machine) was loaded with the sodium cyanide filter cake by means of a screw. Briquets were obtained which exhibited a strength of 200-300N (force at which the pillow breaks) after a post-hardening period of at most 30 minutes. Moist NaCN crystallisate compacted in a temperature range of between 50 and 70° C. exhibited post-hardening of the briquet during subsequent cooling, which is probably caused by binding of some of the remaining water as dihydrate water of crystallisation. The composition (wt. %) of the briquets varied in the following range: NaCN=93-99%; NaOH=0.2-0.7%; $Na_2CO_3$ 0.1-0.4%; $NaNCO_2$=0-0.2%. The water content was between 0.5 and 3%.

EXAMPLE 2

Briquetting of Potassium Cyanide

Using KCN crystallisate obtained from a conventional rotary filter (KCN=88-90%; KOH=0.3-0.6%; water=8-10%), briquets were produced as in Example 1. The strength of the briquets obtained was less than that of the NaCN briquets, but wholly adequate for storage, transport and dust-free handling. The compacted material had an average composition of 97-99% KCN, 0.2-0.6% KOH and 0.2-2% water. The Table contains the material parameters of certain Examples.

EXAMPLES 3.1 TO 3.4

Compaction of NaCN Crystallisate Isolated by Means of a Centrifuge

NaCN crystallisate with a residual moisture level of 2-10 wt. % $H_2O$ was obtained using a conventional centrifuge. The NaCN content of the crystallisate was between 90 and 96%. The concentrations of the minor constituents (NaOH, carbonate and formate) were within the same ranges as described in Example 1. The temperature of the crystallisate used was between 15 and 50° C. Post-hardening of the material obtained after compaction was observed for the crystallisate from the centrifuge in the same way as with the NaCN isolated with the rotary filter. The briquets obtained had NaCN contents of 97-99% and water concentrations of 0.2-5%. No increase in formate and carbonate concentrations was to be noted in this case either.

EXAMPLE 4

Compaction of KCN crystallisate isolated by centrifuge produced results comparable to those where rotary filter material was used according to Example 2.

TABLE

| Example no. | Crystallisate feedstock | | | Briquetting machine | | Shaped articles | | | |
|---|---|---|---|---|---|---|---|---|---|
| Rotary filter | NaCN (%) | Formate (%) | $H_2O$ (%) | Temperature of cryst. (° C.) | Moulding pressure | NaCN (%) | Formate (%) | $H_2O$ (%) | Strength [3] |
| 1.1 | 90.7 | 0.1 | 7.0 | 60 | 170 bar [1] | 98.9 | 0.1 | 0.5 | 300 |
| 1.2 | 90.8 | 0.2 | 8.3 | 70 | 35 kN [2] | 93.7 | 0.2 | 5.5 | 250 |
| 2.1 | KCN 89.7 | 0.1 | 9.2 | 60 | 30 kN [2] | KCN 97.4 | 0.1 | 2 | 90 |
| Centrifuge | NaCN | | | | | NaCN | | | |
| 3.1 | 93.4 | 0.2 | 5.5 | 50 | 35 kN [2] | 94.8 | 0.2 | 4.4 | 200 |
| 3.2 | 95.0 | 0.1 | 3.0 | 55 | 40 kN [2] | 99.0 | 0.1 | 0.2 | 180 |
| Comparative Example | 99.5 | 0.1 | 0.1 | 200 | 170 bar [1] | 99.5 | 0.1 | 0.1 | 1000 |

[3] Stated in N, since seating values per surface area is problematic owing to the pulvinate geometry of the briquet
[1] In this test, an industrial briquetting machine (flexible rolls, hydraulics) was used; contact pressure in bar; cannot be applied to experimental briquetting machines (rigid rolls, pressure generation by precompacting screw, stated in kN)
[2] Experimental briquetting machine

The invention claimed is:
1. Briquets of sodium cyanide comprising:
   0.2 to 5 wt % of water,
   0.2 to 0.7 wt % of sodium hydroxide,
   0.1 to 0.4 wt % of sodium carbonate,
   0 to 0.2 wt % of sodium formate, and
   0 wt % of a shaping auxiliary,
   wherein the briquets exhibit substantially no formate or ammonia formation and no undesired HCN polymerisation and no discoloration over three months of storage.
2. Briquets of sodium cyanide comprising:
   0.2 to 5 wt % of water,
   0.2 to 0.7 wt % of sodium hydroxide,
   0.1 to 0.4 wt % of sodium carbonate,
   0 to 0.2 wt % of sodium formate, and
   0 wt % of a shaping auxiliary, and a breaking strength between 180 to 300 N.
3. Briquets of sodium cyanide consisting of:
   sodium cyanide,
   0.2 to 5 wt % of water,
   0.2 to 0.7 wt % of sodium hydroxide,
   0.1 to 0.4 wt % of sodium carbonate,
   0 to 0.2 wt % of sodium formate, and
   0 wt % of a shaping auxiliary.

* * * * *